United States Patent [19]

Kane

[11] 4,447,949
[45] May 15, 1984

[54] WIRE STRIPPER

[76] Inventor: Michael W. Kane, 2712 - 65th Ave. North, Minneapolis, Minn. 55430

[21] Appl. No.: 429,094

[22] Filed: Sep. 30, 1982

[51] Int. Cl.³ ............................................... H02G 1/12
[52] U.S. Cl. ........................................ 30/90.6; 83/924
[58] Field of Search .............................. 81/9.5 R, 9.51; 30/90.1, 90.6; 83/924

[56] References Cited

U.S. PATENT DOCUMENTS

| | | | |
|---|---|---|---|
| 1,165,176 | 12/1915 | Hornor | 30/90.6 |
| 1,835,597 | 12/1931 | Hill et al. | 81/9.51 |
| 3,151,510 | 10/1964 | Bunker et al. | 30/90.6 |
| 3,212,369 | 10/1965 | Way | 81/9.5 R |
| 3,696,509 | 10/1972 | Lancaster | 30/90.6 |

FOREIGN PATENT DOCUMENTS 1324321  7/1973  United Kingdom ............. 81/9.5 R

*Primary Examiner*—Roscoe V. Parker
*Attorney, Agent, or Firm*—Kinney & Lange

[57] ABSTRACT

A tool for use in stripping plastic sheath from electrical cable has first and second handles pivotally connected in a scissor-like configuration so that each handle has a grip portion and a jaw portion. Each jaw portion carries a jaw element with a transverse cutting blade and a longitudinal slitting blade. The cable is inserted between the jaw elements so that it extends through the tool between and generally parallel to the handles. When the grip portions are moved together, the jaw elements engage the cable so that each transverse blade makes a transverse cut through the plastic sheath. At the same time each longitudinal blade makes a slit in the plastic sheath near the transverse cut. The tool is then pulled toward a free end of the cable so that each longitudinal blade slits the plastic sheath to the free end. The transverse blades are pivotally mounted on the jaw elements so that they swing away from their cutting position when the tool is moved along the cable. The slit parts of the cable are then peeled away from the interior wires and broken off from the sheath at the transverse cuts.

18 Claims, 13 Drawing Figures

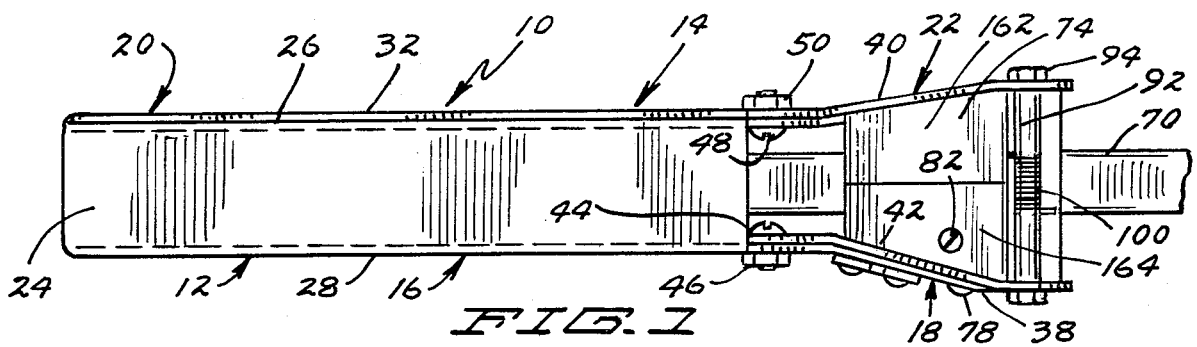
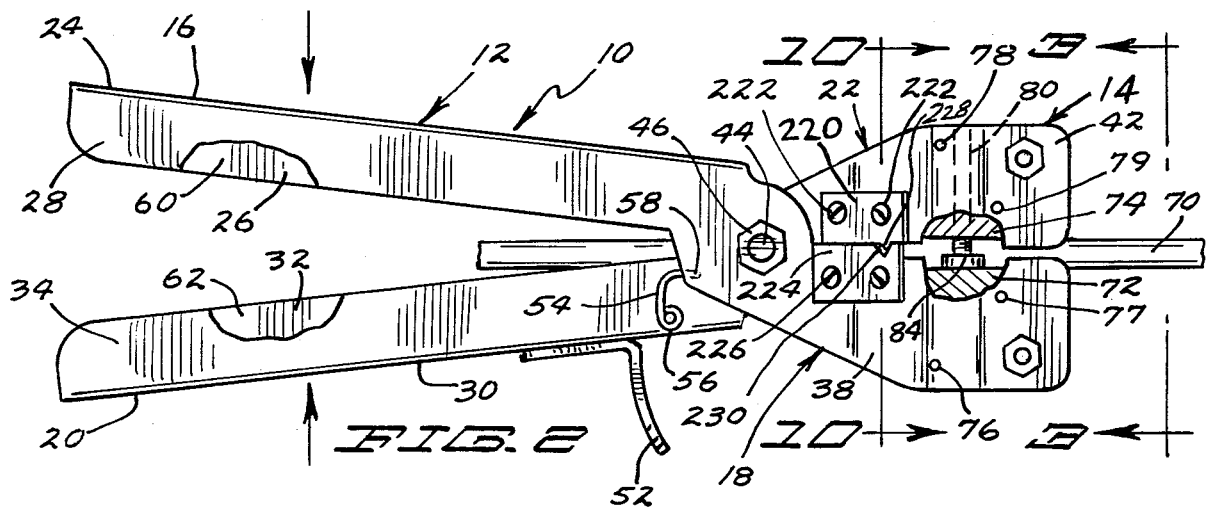
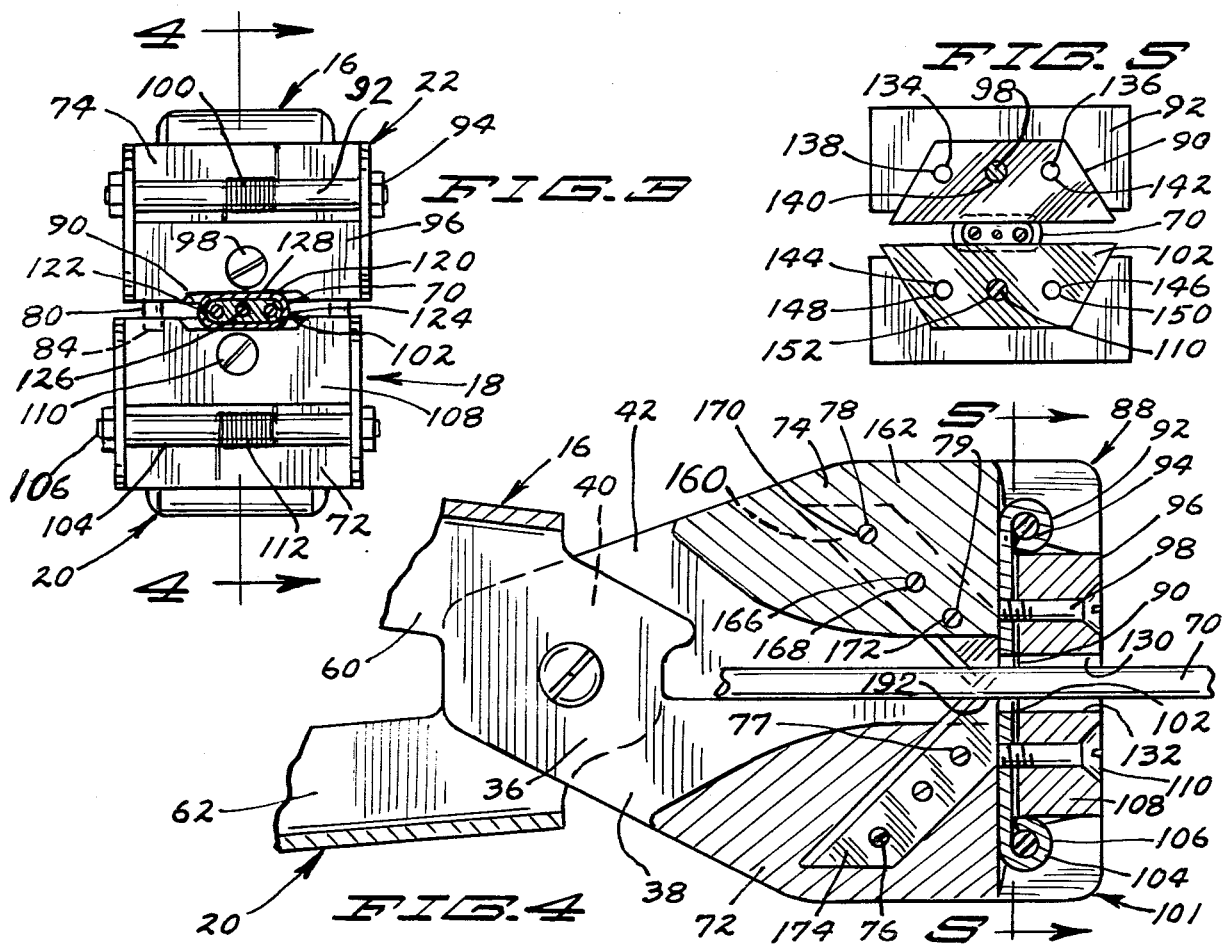

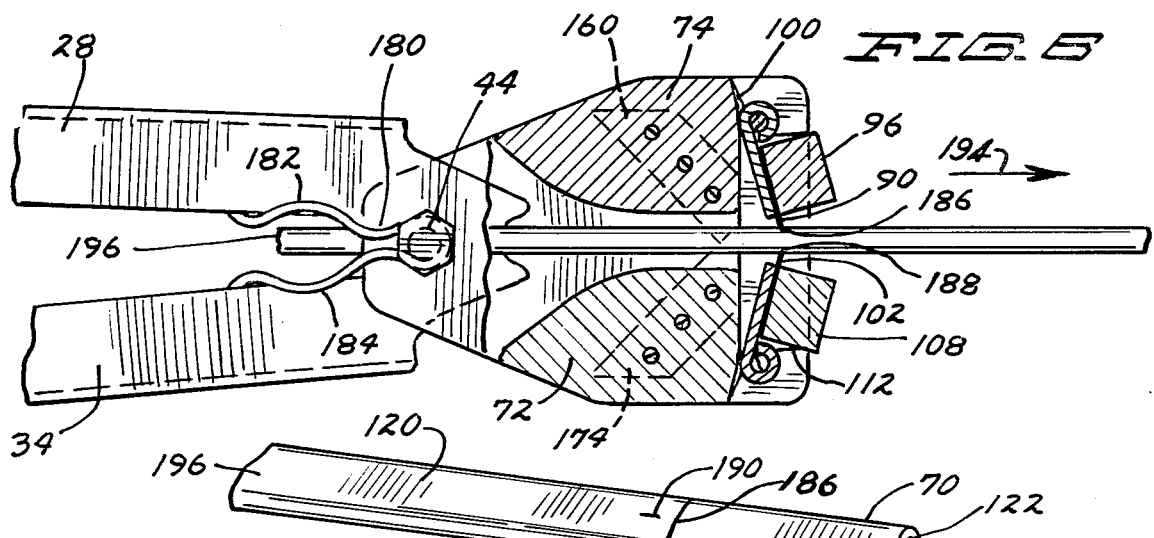
FIG. 6
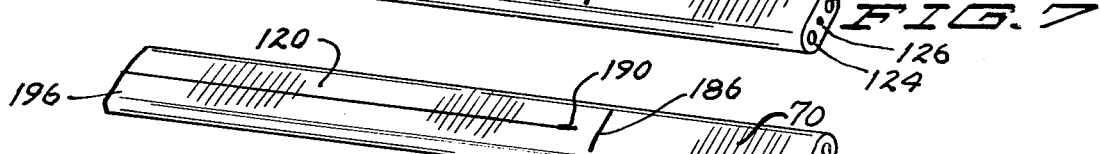
FIG. 7
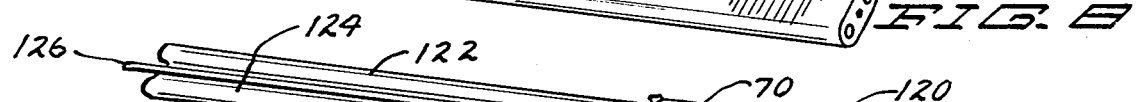
FIG. 8
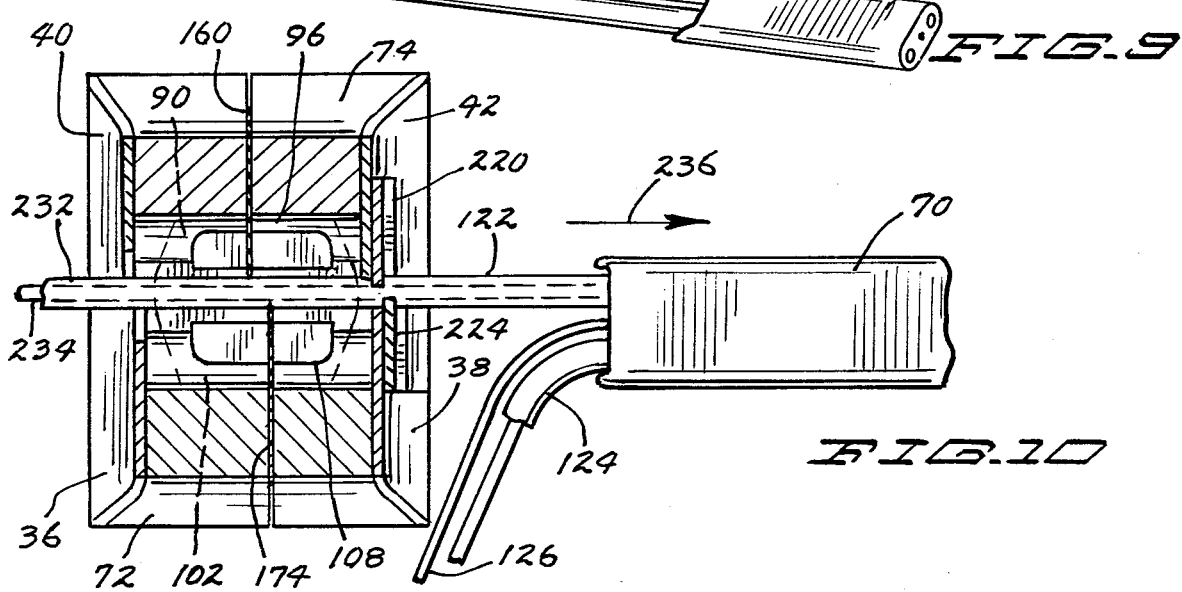
FIG. 9
FIG. 10
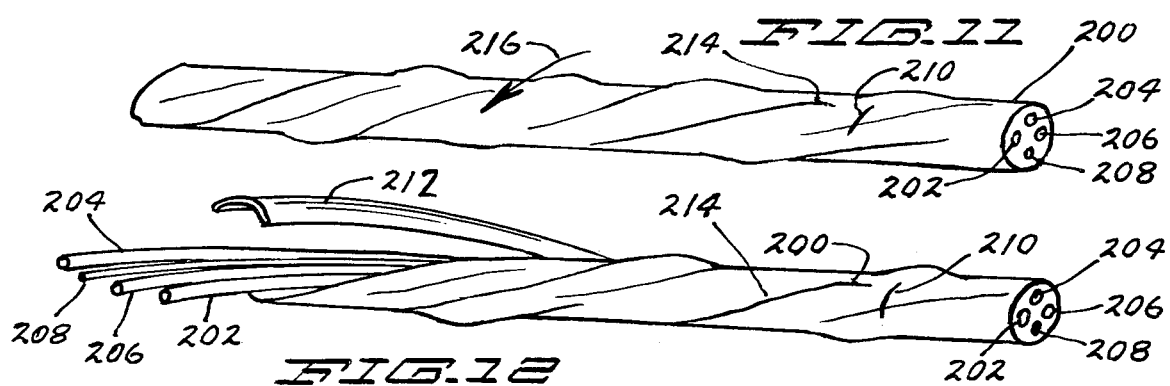
FIG. 11
FIG. 12

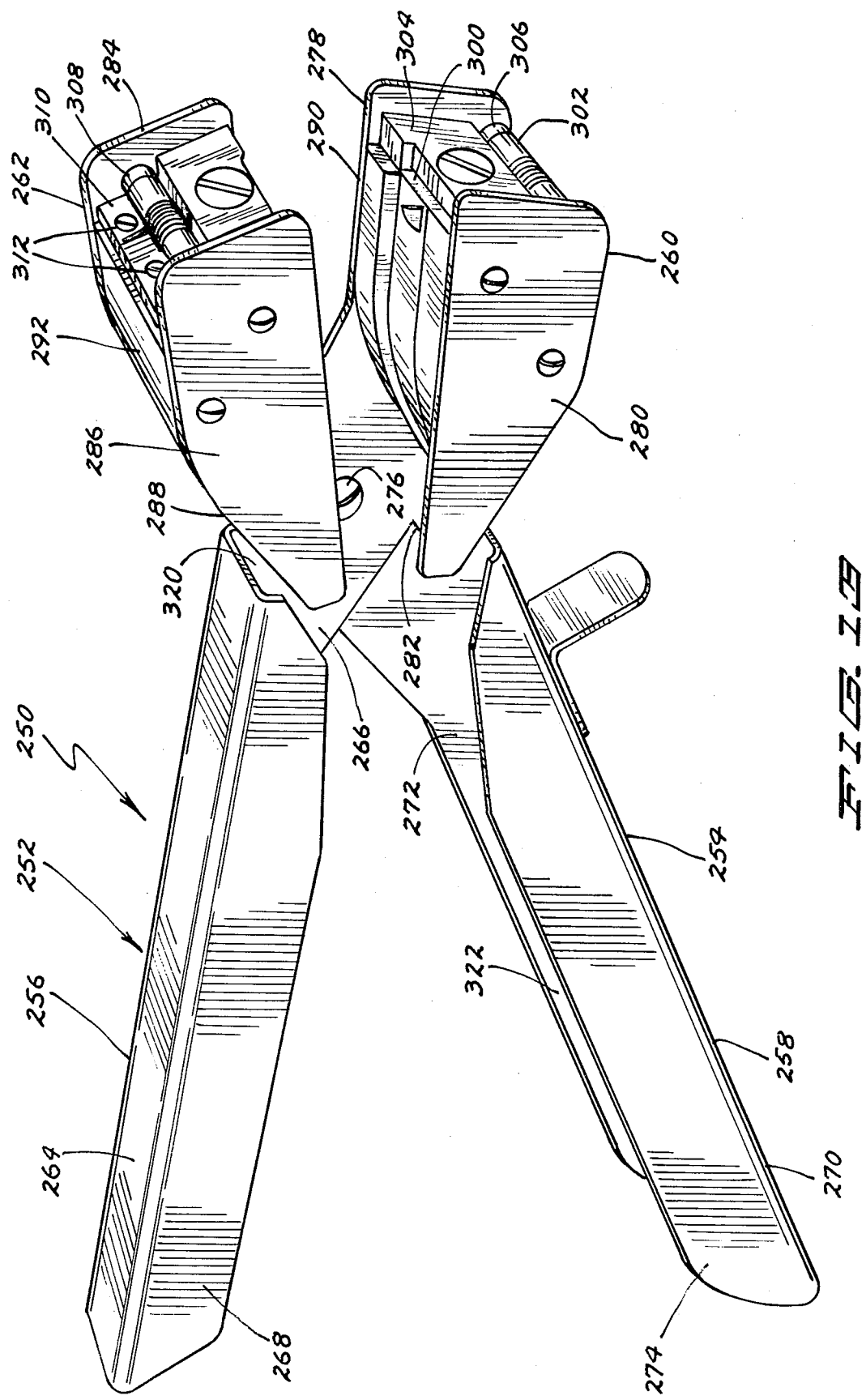

WIRE STRIPPER

BACKGROUND OF THE INVENTION

1. Field of the Invention

This invention relates to tools for stripping sheathing and insulation from electrical cables.

2. Description of the Prior Art

The installation of electrical wiring has been greatly simplified by the use of plastic-sheath cable, such as the type commonly known in the trade as Romex-style cable. The plastic cable normally carries two or three conductive wires with plastic insulation, as well as in uninsulated ground wire.

While the cable is easy to handle, removing the plastic sheath to expose the conductive wires is a troublesome task. Electricians commonly make a longitudinal slit with a utility knife along the length of cable to be stripped. The cable is then spread apart along the slit and broken off at the end of the slit. Some tools have simplified this task by providing a closable handle to clamp a knife blade against the cable to make the longitudinal slit.

The sheathing is quite resilient and resists breaking. Therefore, the tearing of the sheath once a longitudinal slit has been made often results in a jagged edge. The slitting and tearing are also time-consuming. This task slows down the installation job and decreases the productivity of the electrician.

SUMMARY OF THE INVENTION

A tool constructed according to the present invention for stripping plastic sheath from electrical cable includes jaw means with first and second jaw elements for engaging an electrical cable at a location spaced from a free end thereof. The tool includes closing means for urging the jaw elements together to engage the cable. A transverse cutting means is mounted on the first jaw element for making a transverse cut through the plastic sheath generally perpendicular to a longitudinal axis of the cable when the jaw means engages the cable. A longitudinal cutting means is also mounted on the first jaw element adjacent the transverse cutting means for puncturing the plastic sheath at a point near the transverse cut when the jaw means engages the cable. The longitudinal cutting means also slits the sheath as the tool is moved relative to the cable along the longitudinal axis of the cable toward the free end when the jaw means is engaging the cable.

The transverse cutting means is preferably movably mounted on the jaw element so that it has a first cutting position for making the transverse cut and so that it moves to a second non-cutting position when the tool is moved relative to the cable for slitting the sheath. In one preferred embodiment, the transverse cutting means pivots on a shaft to move to the second non-cutting position and is biased to the cutting position by resilient bias means, such as a spring.

The tool preferably includes a second transverse cutting means and second longitudinal cutting means mounted on the second jaw element. The means for urging the jaw elements together preferably includes a pair of handles pivotally attached in a scissor-like configuration wherein each handle has a grip portion and a jaw portion, so that when the grip portions are moved together, the jaw portions move together. Each jaw portion carries one jaw element. The tool further preferably includes resilient bias means, such as a spring, for biasing the grip portions apart, thereby urging the jaw portions apart.

In the preferred embodiment, each grip portion includes a base and first and second side walls, so that the grip portion has a generally U-shaped cross section, forming a channel. The channels of the grip portions oppose each other when the grip portions are moved together, forming a longitudinal path of the tool for the cable.

In another preferred embodiment, only the first sides of the grip portions are pivotally connected, the second sides being spaced apart to form an access opening to allow transverse insertion of the cable between the handles into the longitudinal path.

The tool, in yet another embodiment, further includes means for stripping insulation from an individual wire of the cable. The means for stripping wire includes a stripping blade on the first jaw element, mounted parallel to the longitudinal path and a cooperating means on the second jaw element, which is preferably a second stripping blade.

BRIEF DESCRIPTION OF THE DRAWINGS

FIG. 1 is a top view of a first embodiment of a tool for stripping cable constructed according to the present invention with a cable engaged;

FIG. 2 is a side elevational view of the tool of FIG. 1;

FIG. 3 is a front view of the tool of FIGS. 1 and 2, with the cable shown in cross section along line 3—3;

FIG. 4 is an enlarged cross sectional view taken along line 4—4 of FIG. 3;

FIG. 5 is a reduced cross sectional view taken along line 5—5 of FIG. 4;

FIG. 6 is a side elevational view, partially cut away, of the tool of FIGS. 1 through 5 seen as the cable is moved relative to the tool;

FIG. 7 is a perspective view of a piece of electrical cable with a transverse cut and a hole pierced through the sheath;

FIG. 8 is a perspective view of the cable of FIG. 7 with the hole extended as a slit;

FIG. 9 is a perspective view of the cable of FIG. 8 with the sheath removed;

FIG. 10 is an enlarged vertical cross sectional view taken on the line 10—10 in FIG. 2, with the cable omitted and showing an insulated wire of the cable in position to be stripped;

FIG. 11 is a perspective view of a piece of electrical cable with three conductive wires and a ground wire;

FIG. 12 is a perspective view of the cable of FIG. 11 with the sheath partially removed; and FIG. 13 is a perspective view of a second preferred embodiment of a tool constructed according to the present invention.

DETAILED DESCRIPTION OF THE PREFERRED EMBODIMENTS

A first embodiment of a tool 10 for stripping plastic sheath from electrical cable is illustrated in FIGS. 1–6. Tool 10 has a first handle 12 and a second handle 14. Handle 12 includes a grip portion 16 and a jaw portion 18. Handle 14 includes a grip portion 20 and a jaw portion 22. In the example shown, handles 12 and 14 have a generally U-shaped cross section. Grip portion 16 includes a base 24 and first and second sides 26 and 28. Grip portion 20 has a base 30 and first and second sides 32 and 34.

Jaw portion 18 of first handle 12 includes first jaw plate 36 and second jaw plate 38. Jaw portion 22 of handle 14 includes first jaw plate 40 and second jaw plate 42. Each jaw plate 36, 38, 40, and 42 is integral with one side 26, 28, 32, and 34, respectively. In the example illustrated, handles 12 and 14 are each made of one piece of steel.

Handles 12 and 14 are pivotally connected in a scissor-like configuration. The pivotal mounting, in the example illustrated, is provided by a bolt 44 and nut 46, which connect second sides 28 and 34, and a bolt 48 and nut 50 which connect first sides 26 and 32. Other fasteners, such as rivets, which provide pivotal connection, are satisfactory. Grip portions 16 and 20 are grasped in the palm of the user's hand and squeezed toward each other to urge jaw portions 18 and 22 towards each other. Grip portion 20 is provided with a finger grip 52 for engagement with the forefinger of the user's hand to provide a firmer grip. A latch hook 54 pivots on rivet 56 in side 34 and locks in groove 58 in side 28 in order to lock the tool 10 with grip portions 16 and 20 in a closed position.

Grip portion 16 has a channel 60 partially defined by base 24 and sides 26 and 28. Grip portion 20 has a channel 62 partially defined by base 30 and sides 32 and 34. Channels 60 and 62 extend through the respective handles along a longitudinal axis of tool 10, to together provide a longitudinal path through tool 10 for an electrical cable 70, as shown in FIGS. 1 and 2.

Each jaw portion 18 and 22 carries a jaw element 72 and 74, respectively. In the example illustrated, jaw elements 72 and 74 are plastic blocks. Jaw element 72 is mounted between jaw plates 36 and 38 by bolts 76 and 77. Jaw element 74 is mounted between jaw plates 40 and 42 by bolts 78 and 79.

Mounted in jaw element 74 is a stop means which includes a shaft 80 threadably mounted in jaw element 74. Shaft 80 has a slotted end 82 by which the extension of shaft 80 from block 74 is adjusted. An opposite end of shaft 80 has a stop head 84 for contacting jaw element 72. Therefore, the minimum distance between jaw elements 72 and 74 is adjusted by turning slotted end 82 to vary the amount of shaft 80 which protrudes from jaw element 74.

A first transverse cutting means 88 includes first transverse blade 90, hinge element 92, hinge pin 94, blade block 96, and bolt 98. Hinge element 92 is pivotally mounted on hinge pin 94, which is mounted to first jaw plate 40 and second jaw plate 42. Blade 90 and, in turn, blade block 96 are attached to hinge element 92 by machine screw 98. When transverse blade 90 is in a first cutting position, transverse to cable 70, hinge element 92 rests against jaw element 74.

Means are provided to bias hinge element 92 to its position against jaw element 74, wherein transverse blade 90 is in its cutting position. In the example illustrated the means for biasing is a spring 100 which is helically coiled around hinge pin 94, with ends contacting jaw element 74 and hinge element 92, so that hinge element 92 is urged to the position illustrated in FIG. 4.

A second transverse cutting means 101, mounted on jaw element 72 includes second transverse blade 102, hinge element 104, hinge pin 106, blade block 108, and machine screw 110. The second transverse cutting means operates in identical manner to its opposing first transverse cutting means. In a similar fashion, a spring 112 provides means to bias the second transverse cutting means against jaw element 72 in the position illustrated in FIG. 4. As shown in FIGS. 3 and 4, blades 90 and 102 cut into a plastic sheath 120 of cable 70, which encompasses insulated wires 122 and 124 as well as ground wire 126. Cable 70 also has paper insulation 128 wrapped around wires 122, 124 and 126 inside of plastic sheath 120.

When jaw elements 72 and 74 are urged together, transverse blades 90 and 102 cut into plastic sheath 120 until either stop head 84 contacts jaw element 72 or inward surfaces 130 and 132 of blade blocks 96 and 108, respectively, contact plastic sheath 120. Either of these can prevent transverse blades 90 and 102 from reaching wires 122, 124 and 126.

The mounting of transverse blades 90 and 102 is illustrated in FIG. 5. Hinge element 92 has a pair of positioning pegs 134 and 136. Blade 90, in the example illustrated, is a common, readily available, utility knife blade which has three holes 138, 140 and 142. Hole 138 fits over peg 134 and hole 142 fits over peg 136. Blade block 96 is then positioned against blade 90 and bolt 98 is inserted through hole 140 in blade block 96 and threadably mounted in hinge element 92.

Similarly, blade 102 has holes 144 and 146 which fit on positioning pegs 148 and 150. Machine screw 110 is inserted through a hole 152 and is threadably engaged in hinge element 104.

Jaw element 74 also carries first longitudinal cutting means, which, in this example, includes a first slitting blade 160. In this example, first slitting blade 160 is of identical construction to blades 90 and 102. Jaw element 74 includes two separable portions 162 and 164. When bolts 78 and 79 are removed, jaw element 74 can be removed from jaw portion 18. Portions 162 and 164 are then separated. As best shown in FIG. 4, a peg 166 extending outwardly from portion 162 of jaw element 74 passes through a central hole 168 in blade 160 and positions blade 160 against portion 162, so that holes 170 and 172 of blade 160 are aligned for insertion of bolts 78 and 79, respectively. To change blade 160, once portions 162 and 164 are separated, a new blade 160 is slipped over peg 166. Portions 162 and 164 are then realigned between plates 40 and 42. Bolts 78 and 79 are then reinserted.

A second longitudinal cutting means comprises a second slitting blade 174 which is mounted in jaw element 72 in identical fashion to the manner in which blade 160 is mounted in jaw element 74, but for sake of simplicity is not separately described.

When jaw elements 72 and 74 are urged together, slitting blades 160 and 174 pierce plastic sheath 120 of cable 70. Blades 160 and 174 are offset slightly so that they overlap when viewed from the side as in FIG. 4. This results in each slitting blade 160 and 174 cutting on an opposite side of ground wire 126.

A bias means for urging apart grip portions 16 and 20 includes a spring 180 which is shown in FIG. 6. Spring 180 is a generally V-shaped spring mounted over bolt 44 with legs 182 and 184 hooked under side 28 of grip portion 16 and side 34 of grip portion 20, respectively. Spring 180 is constructed so that legs 182 and 184 tend to remain apart, urging grip portions 16 and 20 apart.

The operation of stripping plastic sheath 120 with tool 10 is illustrated in FIGS. 4–9. When jaw elements 72 and 74 are closed on cable 70, as shown in FIGS. 4 and 5, transverse blades 90 and 102 make transverse cuts 186 and 188 in sheath 120 of cable 70. Slitting blades 160 and 174 pierce plastic sheath 120 to make punctures 190 and 192. The state of the cable after the transverse cuts and punctures is shown in FIG. 7.

Cable 70 is then drawn relative to tool 10 in the direction shown by arrow 194 in FIG. 6, so that tool 10 moves toward free end 196 of the cable. Hinge elements 92 and 104 pivot away from jaw elements 74 and 72, respectively, as shown in FIG. 6. Therefore, transverse blades 90 and 102 are moved to a noncutting position as cable 70 slides through tool 10.

As cable 70 moves, slitting blades 160 and 174 slit plastic sheath 120 to the free end 196 of cable 70, so that cable 70 appears as in FIG. 8. The slit portion of sheath 120 is then peeled off to expose insulated wires 122, 124, and ground wire 126 of cable 70, as shown in FIG. 9. In that figure, the paper wrapping has been omitted as it is torn or stripped off along with the slitted portion of the sheath.

Tool 10 also is adapted for stripping a three-wire plus ground cable 200, as illustrated in FIGS. 11 and 12. Cable 200 has insulated wires 202, 204, 206 and ground wire 208. Transverse blade 90 makes a transverse cut 210 in a plastic cable sheath 212. Slitting blade 160 punctures sheath 212 and makes slit 214. Three wire cables such as cable 200 include wires that are wrapped around one another in a spiral configuration. Therefore, rather than pulling cable 200 directly through tool 10, as was the case for two-wire cable 70, tool 10 is rotated in the direction shown by arrow 216 as cable 200 is drawn through tool 10. This slices sheath 212 of cable 200 in the spiral fashion illustrated in FIG. 12.

Tool 10 also carries means for stripping an individual insulated wire, such as wire 122 of cable 70. A first stripping blade 220 is mounted on jaw portion 22 by screws 222. A cooperating second stripping blade 224 is mounted on jaw portion 18 by screws 226. When jaw portions 18 and 22 are moved towards each other, blades 220 and 224 meet in sliding, overlapping contact. An insulated wire inserted between blades 220 and 224 will be cut when jaw elements 72 and 74 are engaged.

Blade 220 is provided with a notch 228 and blade 224 is provided with a notch 230. Notches 228 and 230 are aligned when blades 220 and 224 are in their overlapped cutting position. FIG. 10 illustrates the use of notches 228 and 230 for stripping. Insulated wire 122 of cable 70 has insulation layer 232 and a copper core 234. Insulated wire 122 is shown inserted between blades 220 and 224 in notches 228 and 230. When blades 220 and 224 engage wire 122, they cut insulation layer 232. The two generally triangular notches 228 and 230 cut insulation layer 232 in four opposed areas without slicing the copper core 234. The depth of cut can be controlled by stop head 84.

Once blades 220 and 224 have cut insulation 232, wire 122 is withdrawn in the direction of arrow 236 so that the blades 220 and 224 hold the insulation layer 232 and strip it off of copper core 234.

A second preferred embodiment of the present invention is illustrated in FIG. 13. In this embodiment, a tool 250 has handles 252 and 254, with grip portions 256 and 258, respectively. Handle 252 has a jaw portion 260 and handle 254 has a jaw portion 262.

Grip portion 256 includes base 264, first side 266 and second side 268. Grip portion 258 includes a base 270, first side 272 and second side 274.

First sides 266 and 272 are pivotally connected by bolt 276.

Jaw portion 260 includes first jaw plate 278, second jaw plate 280 and connecting plate 282. Jaw portion 262 includes first jaw plate 284, second jaw plate 286, and connecting plate 288.

A first jaw element 290 is mounted in jaw portion 260, generally in the same manner as the embodiment described in detail in FIGS. 1–6. A second jaw element 292 is mounted in jaw portion 262 in a similar fashion.

The transverse cutting means differs in its mounting in this embodiment. A first transverse cutting means in jaw portion 260 includes a first transverse blade 300 mounted between a hinge element 302 and a blade block 304, in a similar fashion as described in the first embodiment. The hinge element in this embodiment pivots on a hinge pin 306. A second transverse cutting means in jaw portion 262 has a identical parts, which will not be separately described for sake of brevity. The second transverse cutting means pivots on a hinge pin 308. Pin 308 is shown rotatably mounted on a mounting plate 310, which is attached to jaw element 292 by screws 312. This embodiment allows the entire jaw element 292 or 290 to be removed from its respective Jaw portion 262 or 260 while the transverse cutting means is still mounted in place on its respective jaw element.

The embodiment illustrated in FIG. 13 allows cable to be inserted transversely or sideways between handles 252 and 254. The base 264, first side 266 and second side 268 define a channel 320. Base 270, first side 272 and second side 274 define a second channel 322. Channels 320 and 322 oppose each other and form a longitudinal path through tool 250. Rather than insert the cable longitudinally between the jaw elements and the handles as in the embodiment in FIGS. 1–6, this embodiment allows the cable to be quickly inserted sideways. The example illustrated in FIG. 13 is for a tool which is to be held in the left hand. A mirror image of tool 250 would be held in the right hand and allow cable insertion sideways with the left hand.

A tool constructed according to the present invention provides all the functions required by the electrician in preparing plastic-sheath cable for installation. Unlike prior art devices which required separate tools or separate steps for making cuts preparatory to stripping, the tool cuts both transversely and longitudinally with one closing of the jaws. In the embodiments illustrated, the two transverse cuts and the two longitudinal slits prepare the cable so that the plastic sheath can be easily snapped off at the point where the slits meet the transverse cut. The movable transverse cutting means simplifies the operation in that, after the initial transverse cut, the longitudinal cut can be made without further cutting contact in the cable by the transverse cutting means.

Although the present invention has been described with reference to preferred embodiments, workers skilled in the art will recognize that changes may be made in form and detail without departing from the spirit and scope of the invention.

What is claimed is:

1. A tool for use in stripping an end portion of plastic-sheathed electrical cable comprising:
   jaw means with first and second jaw elements for engaging, at a location spaced from a free end thereof, an electrical cable having a plastic sheath;
   closing means for urging the jaw elements together to engage the cable;
   transverse cutting means mounted on the first jaw element for making a transverse cut through the plastic sheath generally perpendicular to a longitudinal axis of the cable when the jaw means engages the cable, said transverse cutting means being movably mounted on the jaw element so that it has a first cutting position for making the transverse cut and so that it moves to a second non-cutting position when the tool is moved relative to the cable for slitting the sheath; and longitudinal cutting means mounted on the first jaw element adjacent the transverse cutting means toward the free end of the cable for puncturing the plastic sheath at a point near the transverse cut when the jaw means engages the cable and for slitting the sheath as the tool is moved relative to the cable along the longitudinal axis of the cable toward the free end thereof.

2. The tool of claim 1 wherein the movably mounted transverse cutting means includes a hinge pin on which the transverse cutting means pivots to the second position when the tool is moved relative to the cable along the longitudinal axis.

3. The tool of claim 2 further comprising:
a resilient means for biasing the transverse cutting means toward its first position.

4. The tool of claim 3 wherein the resilient bias means is a spring mounted on the hinge pin.

5. The tool of claim 1 wherein the closing means includes:
first and second handles, each handle having a grip portion and a jaw portion, the handles being pivotally connected between the grip portions and the jaw portions in a scissor-like configuration; and
wherein each jaw element is mounted in one jaw portion and each grip portion lies in generally longitudinally aligned relation to one of said jaw elements.

6. The tool of claim 5 wherein the closing means further includes:
resilient bias means for biasing the grip portions apart, thereby pivoting the jaw portions apart.

7. The tool of claim 5 wherein each grip portion includes a base and a pair of sides which define a U-shaped channel, the channels being opposed so that they define a longitudinal cable path through the tool generally perpendicular to the transverse cutting means.

8. The tool of claim 5 wherein:
each handle has a first side and second side, the two first sides being pivotably connected and the two second sides being spaced apart to allow transverse insertion of the cable between the handles to a position wherein the longitudinal axis of the cable is generally perpendicular to the transverse cutting means.

9. The tool of claim 1 further comprising:
a second transverse cutting means mounted on the second jaw element for making a second transverse cut of the plastic sheath, parallel to the first transverse cut on an opposite side of the sheath.

10. The tool of claim 9 wherein each transverse cutting means includes a transverse blade.

11. The tool of claim 1 further comprising:
means mounted on the first and second jaw elements for stopping the jaw elements a predetermined distance apart when the closing means urges the jaw elements together, so that the transverse cut and the puncture are limited in depth.

12. The tool of claim 11 wherein the means for stopping is adjustable.

13. The tool of claim 1 further comprising:
means for stripping insulation from an individual wire of the cable.

14. The tool of claim 13 wherein the means for stripping insulation includes a stripping blade mounted on one jaw portion and cooperating contact means on the other jaw portion.

15. The tool of claim 14 wherein the cooperating contact means is a second stripping blade.

16. The tool of claim 13 wherein the stripping blade is mounted generally perpendicular to the transverse cutting means and has a notch so that when the wire to be stripped is inserted in the notch between the stripping blade and the contact means generally parallel to the transverse cutting means and the handles are compressed to move the stripping blade toward the cooperating contact means on the other jaw element, the stripping blade cuts the insulation and allows the wire to be withdrawn to pull off the cut insulation.

17. A tool for use in stripping an end portion of plastic-sheathed electrical cable comprising:
first and second handles pivotally connected in a scissor-like configuration, each handle having a grip portion and a jaw portion, so that the jaw portions are moved towards each other to engage a cable with a plastic sheath, at a location spaced from a free end thereof, when the handle portions are moved together;
bias means for biasing the handles apart;
a jaw element mounted on each jaw portion;
each handle having a base and a pair of sides which define a U-shaped channel, the channels being opposed to define a longitudinal, cable receiving, path generally centrally therethrough and extending between the jaw elements;
a first transverse blade mounted in the first jaw element in position for making a transverse cut in a plastic sheath on a cable lying in the cable receiving path when the jaw elements engage, said first transverse blade being movably mounted in the first jaw element so that it has a first cutting position for making the transverse cut and so that it moves to a second non-cutting position when the tool is moved relative to the cable for slitting the sheath; and
a first slitting blade, mounted in the first jaw element adjacent the first transverse blade, said slitting blade being generally parallel to the longitudinal path so that it pierces the plastic sheath near the transverse cut when the jaw elements engage and slits the sheath longitudinally when the tool is moved relative to the cable along the longitudinal axis toward the free end.

18. The tool of claim 17 further comprising a second transverse blade and second slitting blade similarly mounted in the second jaw element.

* * * * *